(12) United States Patent
Quade et al.

(10) Patent No.: US 10,683,940 B1
(45) Date of Patent: Jun. 16, 2020

(54) VALVE ARRANGEMENT FOR A COOLING SYSTEM OF A VEHICLE

(71) Applicant: ILLINOIS TOOL WORKS INC., Glenview, IL (US)

(72) Inventors: Peter Quade, Bad Fallingbostel (DE); Torsten Hauk, Neustadt (DE); Carsten Heldberg, Kirchlinteln (DE); Florian Clausing, Neustadt (DE); Rainer Gramss, Buchholz (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 16/220,159

(22) Filed: Dec. 14, 2018

(51) Int. Cl.
| | |
|---|---|
| *F16K 1/54* | (2006.01) |
| *F16K 15/18* | (2006.01) |
| *F16K 31/524* | (2006.01) |
| *F16K 31/53* | (2006.01) |
| *F01P 5/12* | (2006.01) |
| *F01P 7/14* | (2006.01) |

(52) U.S. Cl.
CPC ............... *F16K 1/54* (2013.01); *F16K 15/18* (2013.01); *F16K 31/5245* (2013.01); *F16K 31/53* (2013.01); *F01P 2005/125* (2013.01); *F01P 2007/146* (2013.01); *F01P 2060/08* (2013.01)

(58) Field of Classification Search
CPC ........ F16K 1/54; F16K 15/18; F16K 31/5245; F16K 31/53; F01P 2005/123; F01P 2007/146; F01P 2060/08

USPC ...................................................... 123/41.08
See application file for complete search history.

(56) References Cited

U.S. PATENT DOCUMENTS

| | | | |
|---|---|---|---|
| 2011/0115319 A1* | 5/2011 | Schade ................. | F16K 31/047 310/83 |
| 2014/0346380 A1* | 11/2014 | Bourqui ................ | F16K 31/041 251/129.11 |
| 2015/0159770 A1* | 6/2015 | Foucaut ................ | F16K 31/528 137/15.18 |
| 2016/0169124 A1* | 6/2016 | Hioka ................. | F02D 13/0207 123/90.16 |

* cited by examiner

*Primary Examiner* — Joseph J Dallo
*Assistant Examiner* — Yi-Kai Wang
(74) *Attorney, Agent, or Firm* — Thompson Hine LLP

(57) ABSTRACT

A valve arrangement for a cooling system of a vehicle includes a housing having at least two cooling-liquid ports, and a valve element, which can be adjusted between an open position in which it opens up a connection between the cooling-liquid ports and a closed position in which it separates the connection between the cooling-liquid ports. A drive is provided for adjusting the valve element between the open position and the closed position, wherein the drive includes an electric motor, which motor drives an actuation element which actuates the valve element, wherein the actuation element moves along a circular path section in the course of an adjustment of the valve element between the open position and the closed position.

18 Claims, 3 Drawing Sheets

VALVE ARRANGEMENT FOR A COOLING SYSTEM OF A VEHICLE

Figure 2:
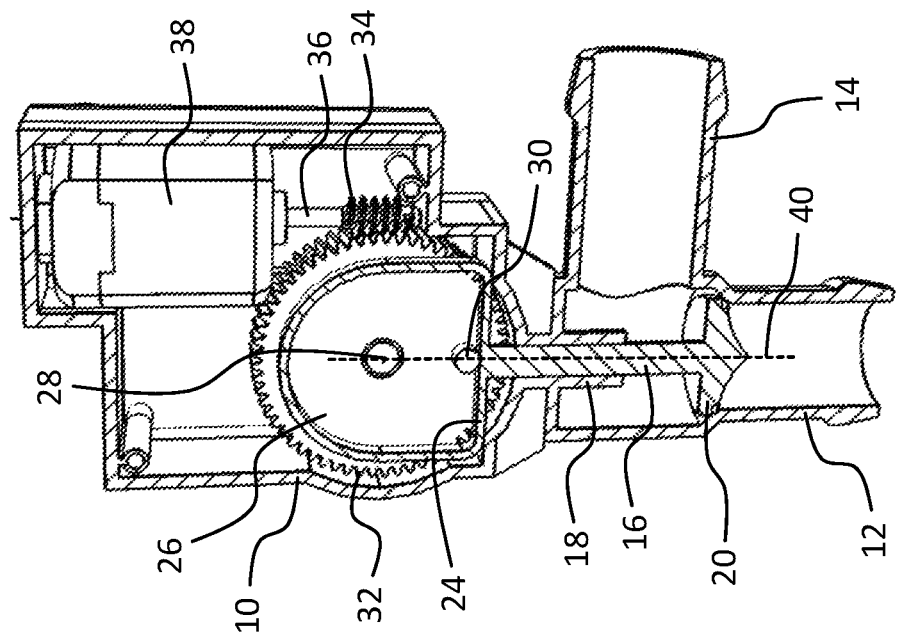

The invention relates to a valve arrangement for a cooling system of a vehicle comprising a housing having at least two cooling-liquid ports, further comprising a valve element, which can be adjusted between an open position in which it opens up a connection between the cooling-liquid ports and a closed position in which it separates the connection between the cooling-liquid ports, and comprising a drive for adjusting the valve element between the open position and the closed position.

For smaller valves for switching auxiliary circuits in cooling systems of motor vehicles, simple and inexpensive electrically switchable valve arrangements are desired. Due to the relatively small volumetric flows in such auxiliary circuits and in order to design the valve arrangements in a simple and inexpensive manner, plate valves (also denoted as piston valves or poppet valves) are frequently used in these applications. The movement of the plate valves into the closed position takes place counter to the liquid pressure of the cooling liquid flowing through the cooling system. Drives for driving the valve element have to apply high forces over a short distance and for a short time in the closing region, i.e. before and until reaching the closed position of the valve element, when the pressure difference via the approximately closed valve element results in increased actuating forces. Before reaching this closing region and also before opening the valve element, however, significantly lower forces are merely required. In the prior art, electromagnetic drives comprising coils are used for such valve elements. Since the maximum available actuating force is predetermined by the arrangement of the magnet, this arrangement has to be of large dimensions in order to be able to implement for the aforementioned reasons the relatively high maximum actuating force to be applied. This makes the drive complex and expensive.

Moreover, non-return valves are used in some cases in cooling systems of vehicles, said valves being automatically pushed open in a flow direction by the cooling liquid flow but being closed by the cooling liquid flow when a cooling liquid flows in the opposing flow direction. This is required, for example, if after turning off an internal combustion engine and thus the main water pump a small cooling liquid flow produced by small electrical auxiliary liquid pumps might circulate through some branches of the cooling system counter to the flow direction which prevails during operation. In current cooling systems which have a so-called cold start shut-down, i.e. which during the heating-up phase of the internal combustion engine do not permit a circulation of cooling liquid, specialized non-return valves are required. These non-return valves, for example, are designed to be lockable by an electrical device in the closed position in order to prevent entirely the circulation of cooling liquid, but they may be unlocked at a later time in order to fulfill their function as a non-return valve. The provision of this non-return valve function is also complex in known drives.

Proceeding from the aforementioned prior art, the object of the invention is to provide a valve arrangement of the type mentioned in the introduction which implements the desired functionality in a simple and cost-effective manner.

The invention achieves the object by the subject-matter of claim 1. Advantageous embodiments are disclosed in the dependent claims, the description and the figures.

For a valve arrangement of the type mentioned in the introduction, the invention achieves the object by the drive comprising an electric motor, which motor drives the actuation element which actuates the valve element, wherein the actuation element moves along a circular path section in the course of an adjustment of the valve element between the open position and the closed position.

The valve arrangement according to the invention is provided for a cooling system of a vehicle, for example a passenger motor vehicle or a truck. The cooling system is, in particular, provided for an engine, for example an internal combustion engine of the vehicle. The valve arrangement comprises a housing with two or more cooling-liquid ports. During operation, cooling liquid lines of the cooling system are connected to the cooling-liquid ports and during operation the cooling liquid, for example water, circulates through these cooling liquid lines. The valve arrangement according to the invention may be provided, in particular, for switching an auxiliary circuit in such a cooling system, smaller volumetric flows of cooling liquid flowing in said valve arrangement than in the main circuit of the cooling system.

According to the invention, the drive comprises an electric motor, in a particularly cost-effective manner for example a direct current motor (DC motor). The electric motor drives an actuation element which actuates the valve element for moving between the open position and the closed position. To this end, the actuation element, for example, bears against an actuation section of the valve element. The actuation element driven by the electric motor moves along a circular path section when adjusting the valve element between the open position and the closed position. An approximately sinusoidal working stroke may be achieved, effected by the circular movement of the actuation element. In this manner, in a manner described in more detail below, a high actuating force may be exerted with a small stroke speed of the valve element in the closing region of the valve element when said valve element is shortly before the closed position and as far as the closed position. An approximately hyperbolic force curve is produced for the closing force, wherein the greatest closing force is made available in the region of the closed position of the valve element, when the approximately sinusoidal movement of the actuation element is in the region of the peak of the sine curve. The invention uses a similar principle to a toggle lever in which an increased actuating force is specifically provided due to the lever action. As a result, the electric motor which is used as the drive may have smaller dimensions, whilst having sufficient closing force at all times. A complex electromagnetic drive having larger dimensions is not required. The drive according to the invention is automatically blocked in the currentless state. By the relatively short switching-on period of the electric motor an operation close to the stoppage threshold is possible without overheating the electric motor. Moreover, only a simple acknowledgement of the position of the valve element when it reaches the closed position is required for the control thereof. The drive unit according to the invention may be produced as a whole in a more simple and cost-effective manner than in the prior art. At the same time, a reliable function is ensured at all times in the desired manner.

As already mentioned, the valve element may be adjusted by the actuation element from the open position into the closed position against the pressure of cooling liquid flowing through the cooling-liquid ports during operation of the valve arrangement. The cooling liquid flowing during operation through the cooling system, therefore, pushes the valve element in the direction of the open position. The drive operates counter to this liquid pressure. In particular, separate pretensioning means, for example spring pretensioning means, do not have to be provided in order to pretension the valve element into the open position.

In a particularly practical embodiment, the valve element may be a plate valve element having a valve plate held at one end of a valve rod, which plate, in the closed position, bears against an assigned valve seat and, in the open position, is lifted off the valve seat. Such plate valves (also denoted as tappet valves or piston valves) are known per se. By an axial movement of the valve rod, an opening and closing of the valve is carried out in a simple and reliable manner. In the closed position, the valve plate bears sealingly against the valve seat.

As also explained in principle, at a constant rotational speed of the actuation element, the stroke speed of the plate valve element effected by the actuation element may be decreased starting from the open position until the closed position is reached. In particular, a continuous reduction of the stroke speed may be carried out when adjusting the plate valve element from the open position into the closed position. The stroke speed of the plate valve element effected by the actuation element is zero, in particular, when the closed position is reached.

According to a further embodiment, in the closed position of the plate valve element, the actuation element may be positioned on an imaginary extension of the longitudinal axis of the valve rod. Moreover, the rotational axis of a rotary disk bearing the actuation element, for example, may be located on an imaginary extension of the longitudinal axis of the valve rod. An imaginary connecting line between the central point of such a rotary disk forming the rotational axis and the actuation element in the closed position, therefore, is located on an extension of the longitudinal axis of the valve rod. In the closed position, therefore, the actuation element may be located at the lowest point of the circular path section described thereby. As already mentioned in the introduction, in the closed position of the valve element the actuation element is located, in particular, at the peak of the circular path and/or sine curve described thereby. As already mentioned in the introduction, as a result, the greatest closing force is thus exerted in the region of the closed position, when the cooling liquid pressure acting against the closing of the valve element is at its greatest.

According to a further embodiment, a stop may be provided which prevents the valve plate being lifted off the valve seat beyond the open position. The stop prevents the valve plate from being pushed off the valve seat further than the open position by the pressure of the cooling liquid.

According to a further embodiment, it may be provided that an actuation section of the plate valve element is provided at that end of the valve rod which is remote from the valve plate, and in that the actuation element, at least during its movement along the circular path section between the open position and the closed position of the plate valve element, bears against the actuation section. The actuation element, for example an actuation projection, bears against the actuation section for adjusting the plate valve element. In particular, the actuation element optionally pushes the actuation section and thus the valve plate counter to the pressure of cooling liquid flowing through the cooling-liquid ports into the closed position, wherein this leads to an axial movement of the valve rod.

According to a further embodiment, it may be provided that the actuation element can be moved along a complete circular path by means of the electric motor, wherein starting from the open position as the starting position, the plate valve element is able to be moved into the closed position by means of a movement of the actuation element along the circular path in a first direction of rotation and through a first rotation angle range, wherein the plate valve element is able to be moved from the closed position back into the open position by means of a further movement of the actuation element along the circular path in the first direction of rotation and through a second rotation angle range and wherein the plate valve element is able to be moved back into the open position as the starting position by means of a further movement of the actuation element along the circular path in the first direction of rotation and through a third rotation angle range, wherein the plate valve element can, at least through part of the third rotation angle range, be moved freely between the open position and the closed position. The actuation element may be at least partially out of contact with the actuation section through the third rotation angle range, in particular when the valve element is in the open position. With a further rotation of the actuation element in the first direction of rotation, the plate valve element is pushed out of the open position as the starting position back into the closed position. The actuation section may optionally be rotated with the rotary disk fully and repeatedly by 360°. Thus it is possible in a manner which is particularly simple in terms of control technology to rotate the actuation element only in one direction of rotation. As a result, the electric motor rotating the actuation element and/or the rotary disk may also be designed in a more simple manner. The first and the second rotation angle range may be equal. For example, in each case they may be 45°. For example, when the valve element is in the open position, the actuation element may be out of engagement with the actuation section of the plate valve element in the entire third rotation angle range or only through a portion of the third rotation angle range. The third rotation angle range may be, for example, 270°.

After passing through half of the third rotation angle range, therefore, the actuation element is located once again in the extension of the longitudinal axis of the valve rod, for example. In this resting position of the actuation element, for example, the plate valve element may be movable freely between the open position and the closed position. The plate valve element is thus unguided and, for example, may be moved by the cooling liquid pressure of the cooling liquid flowing through the cooling system. For example, the plate valve element may be pushed into the open position and held therein, wherein a suitable stop, described above, prevents the valve plate from being lifted off the valve seat again. The stop may be formed, for example, by a stop surface of the actuation section, which in the open position of the valve element bears against a corresponding stop surface of the rotary disk.

If the valve element is freely movable between the open position and the closed position, the function described in the introduction as an electrically lockable non-return valve is possible. Thus by holding the actuation element in the third rotation angle range out of contact with the actuation section when the valve element is still located in the open position, a small cooling liquid flow may flow in the flow direction counter to the flow direction prevailing during normal operation of the valve arrangement, until this cooling liquid flow pushes the valve element into the closed position.

A control device may also be provided which is designed to activate the electric motor for the adjustment of the valve element between the open position and the closed position by means of a movement of the actuation element in the first direction of rotation. The control device may be designed, in particular, to rotate the actuation element exclusively in the first direction of rotation. Moreover, the control device may be designed to produce the described non-return valve function, to activate the electric motor for holding the actuation element in the third rotation angle range, so that the valve element is freely movable between the open position and the closed position.

According to a further embodiment, a rotary disk driven in rotation by the electric motor may be provided, wherein the actuation element is an actuation projection arranged on the rotary disk eccentrically with respect to the axis of rotation of the rotary disk, said projection bearing against the valve element for the actuation of the valve element. The actuation projection may, in particular, bear against the actuation section of the plate valve element. The rotary disk may have a concentric recess, i.e. it may be an annular washer. The actuation projection may be, for example, a cylindrical actuating pin. The actuating projection may be arranged on the rotary disk, in an edge region of the rotary disk, and rotates with a rotation of the rotary disk effected by the electric motor along the circular path section and/or the circular path. The rotary axis of the rotary disk formed by the central point of the rotary disk may be located on an imaginary extension of the valve rod, as already mentioned above.

According to a further embodiment, the electric motor may drive the actuation element via a reduction gear mechanism. The force to be applied by the electric motor may be further reduced in this manner. The reduction may be, for example, more than 1:50. The electric motor may drive a drive worm in rotation, wherein the rotary disk has an outer toothing which engages with the drive worm. In this manner, a particularly simple and reliable reduction is possible.

It is also possible to arrange only the electric motor in a dry region sealed by the cooling liquid circulating through the cooling system, but the drive worm including the rotary disk with the outer toothing in a wet region which comes into contact with the cooling liquid during operation. As a result, on the one hand, lubrication of the reduction gear mechanism is achieved and, on the other hand, the gear mechanism temperature is limited to the maximum cooling liquid temperature. The attachment of the liquid valve is also simplified in this manner.

Figure 1:
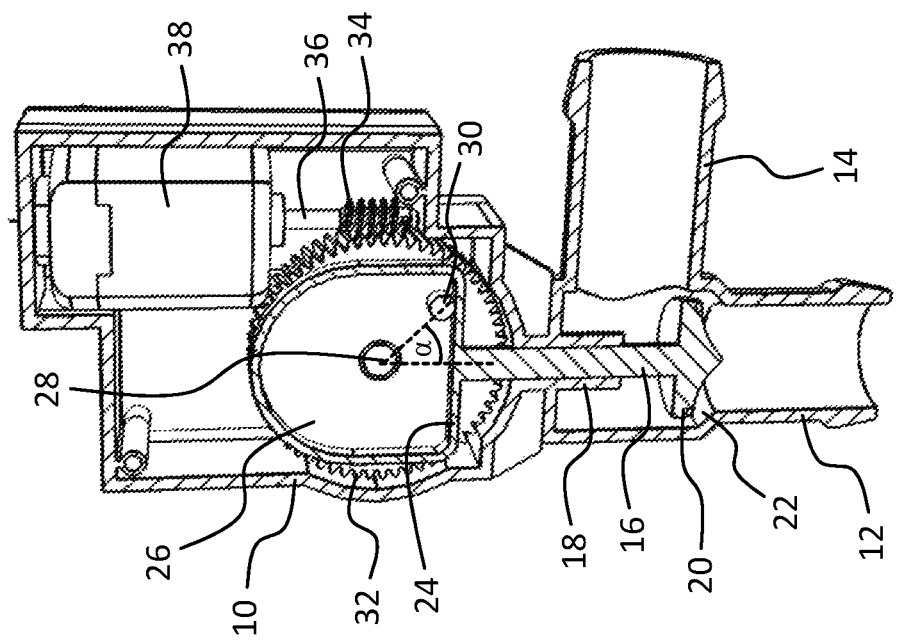
Figure 4:
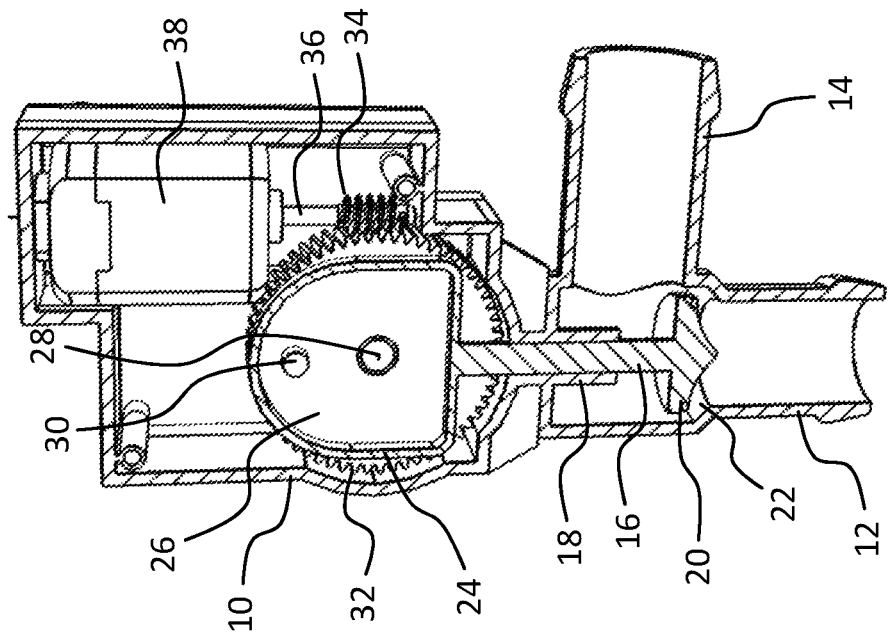
Figure 3:
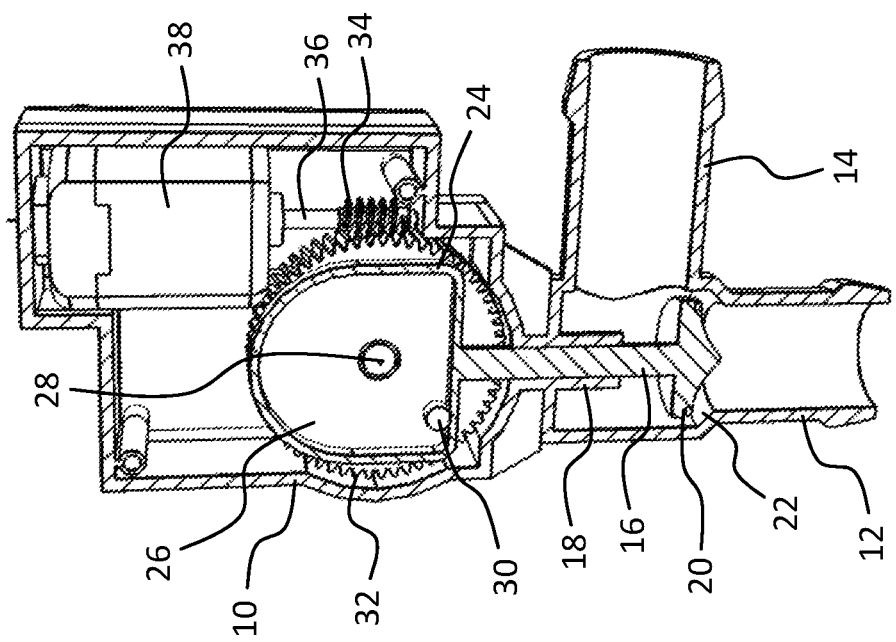
Figure 5:
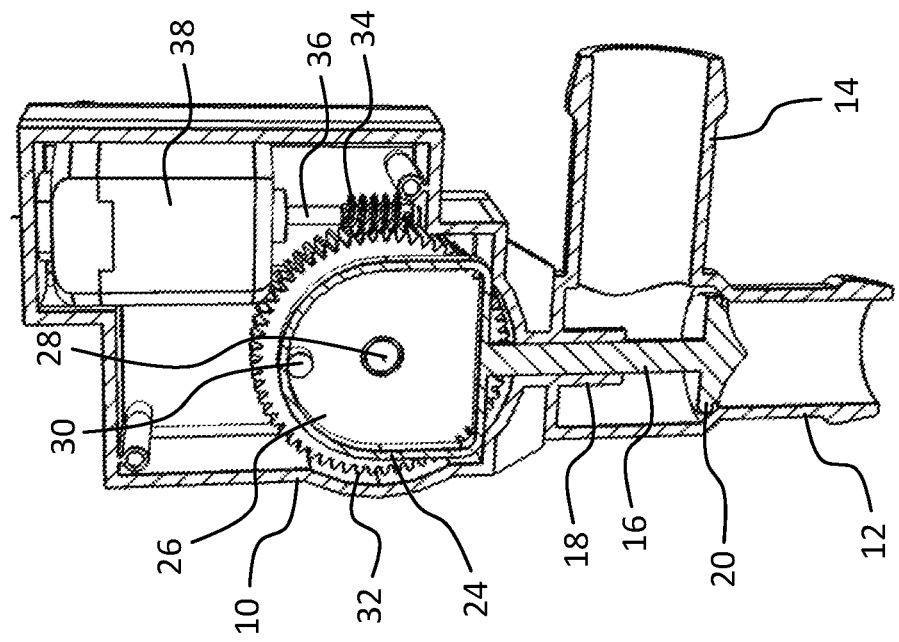

An exemplary embodiment of the invention is described in more detail hereinafter with reference to the figures, in which schematically:

FIG. 1 shows a valve arrangement according to the invention in a first operating position in a perspective sectional view, FIG. 2 shows the valve arrangement of FIG. 1 in a second operating position, FIG. 3 shows the valve arrangement of FIG. 1 in a third operating position, FIG. 4 shows the valve arrangement of FIG. 1 in a fourth operating position and FIG. 5 shows the valve arrangement of FIG. 1 in a fifth operating position.

Unless indicated otherwise, the same reference numerals denote the same objects in the figures.

The valve arrangement according to the invention shown in the figures is provided for a cooling system of a vehicle, for example a passenger motor vehicle or a truck. The cooling system may be part of an engine, for example an internal combustion engine, of the vehicle. In particular, the valve arrangement may be arranged in an auxiliary circuit of such a cooling system. The valve arrangement comprises a housing 10 with a first cooling-liquid port 12 and a second cooling-liquid port 14. The cooling-liquid ports 12, 14 are connected during operation to cooling liquid lines of the cooling system. A valve element, in the example shown a plate valve element, is arranged in the housing. The plate valve element has a valve rod 16 which is axially movably guided in a guide 18 of the housing 10. A valve plate 20 is arranged on the lower end of the valve rod 16 in the figures. The valve plate 20 cooperates with a valve seat 22 of the housing 10, said valve seat being conical in the example shown. To this end, the valve plate 20 has on its lower face a sealing surface which in the closed position of the valve element shown in FIG. 2 bears sealingly against the valve seat 22 and thus separates a connection between the cooling-liquid ports 12, 14. In the open position of the valve element shown in FIG. 1, however, the valve plate 20 is lifted off the valve seat 22 so that cooling liquid may flow through the cooling-liquid ports 12, 14.

A frame-shaped actuation section 24 of the valve element in the example shown is arranged at the end of the valve rod 16 remote from the valve plate 20. In the view of the figures, a rotary disk 26 which is rotatably driven about a rotational axis 28 formed by its central point is located behind the actuation section 24, as is described hereinafter in more detail. An actuation element 30 in the form of an actuation projection 30, in the example shown a cylindrical actuating pin 30, is located in the edge region of the rotary disk 26. The actuation projection 30 bears in the operating positions of the valve arrangement shown in FIGS. 1 to 3 and 5 against an inner surface of the frame-shaped actuation section 24.

The rotary disk 26 has an outer toothing 32 which is in engagement with a drive worm 34. The drive worm 34 is driven via a drive shaft 36 by an electric motor 38, in the example shown a direct current motor (DC motor). The valve element with its actuation section 24, the rotary disk 26, the drive worm 34, the drive shaft 36 and the electric motor 38 are all located inside the housing 10. In the example shown, the guide 18 of the housing at the same time provides a sealing function so that the aforementioned components are arranged in a dry region which is separate from the region flowed through by the cooling liquid during operation, in particular the cooling-liquid ports 12, 14. However, it might also be conceivable, for example, to arrange only the electric motor 38 in a dry region and the drive worm 34, the rotary disk 26 and the actuation section 24 in the wet region. During operation, a reduction is implemented by the described worm gear of, for example, more than 1:50.

Activated, for example, by a suitable control device not shown in more detail, the electric motor 38 drives the rotary disk 26 in a rotational manner via the drive shaft 36 and the drive worm 34. For example, the rotary disk 26 in the figures may be rotated clockwise, in particular exclusively clockwise. The rotary disk 26 may be rotated once or repeatedly by 360°. In the course of this rotation, the actuation projection 30 correspondingly rotates along a circular path and cooperates during this rotation at least periodically with the actuation section 24 for actuating the valve element. This is to be described in more detail hereinafter.

Proceeding from the state shown in FIG. 1, in which the valve element is in its open position, in which the valve plate 20 is lifted off the valve seat 22, the rotary disk 26 is initially rotated into the position shown in FIG. 2. At the same time, it passes through the rotation angle range a shown in FIG. 1. During this movement the fastening projection 30 bears against the inner surface of the actuation section 24, in particular the straight lower face of the actuation section 24, and effects a downward stroke movement of the valve rod 16 so that the valve plate 20 is pushed onto the valve seat 22 and into the closed position shown in FIG. 2.

In FIG. 1, during operation, cooling liquid coming from a cooling liquid line flows into the cooling-liquid port 12, past the valve plate 20 and beyond the cooling-liquid port 14 into a further cooling liquid line. The adjustment of the valve plate 20 from the open position, as the starting position shown in FIG. 1, into the closed position shown in FIG. 2, takes place counter to the liquid pressure of the cooling liquid. As may be identified clearly in FIG. 2, the actuation projection 30 in the closed position is located on an imaginary extension of the vertical longitudinal axis 40 of the valve rod 16 in FIG. 2. This longitudinal axis 40 at the same time forms in its extension an imaginary connecting line between the rotational axis 28 of the rotary disk 26 and the actuation projection 30, in particular its cylinder axis. The rotational axis 28 of the rotary disk 26 formed by the central point of the rotary disk 26 in this case is located on (an imaginary extension of) the longitudinal axis 40 of the valve rod 16.

With a further clockwise rotation of the rotary disk 26 once again by the angle α the actuation projection 30 reaches the position shown in FIG. 3. Due to the position of the rotational axis 28 of the rotary disk 26 on the longitudinal axis 40 of the valve rod 16, the stroke movement of the valve element 20 from the valve seat 22, performed due to the cooling liquid pressure, corresponds to the stroke movement performed previously between the operating positions shown in FIG. 1 and FIG. 2 in the opposing direction. The valve element is thus located once again in its open position in FIG. 3. Due to the described geometry, the closing force exerted on the valve element is at a maximum in the closed position of the valve element. With the rotational speed of the electric motor 38 and thus the rotary disk 26 remaining the same, the stroke speed of the valve element decreases from the open position until the closed position is reached and in the closed position adopts the value of zero. The lateral spacing of the actuation projection 30 from the longitudinal axis of the valve rod 16 forms the effective lever length and is a function of the angle α. The exerted closing force is greater due to the lever function, with a decreasing rotation angle α from the open position shown in FIG. 1 until the closed position shown in FIG. 2 is reached, where it reaches its maximum.

As described, the first rotation angle range which is passed through when the rotary disk 26 is rotated between the operating position of FIG. 1 and the operating position of FIG. 2 may, for example, be 45°. The second rotation angle range which is passed through between the operating position in FIG. 2 and the operating position in FIG. 3 of the rotary disk 26 may also be 45°. By further rotation of the rotary disk 26 through a third rotation angle range, in the example described 270°, the actuation projection 30 again reaches the position shown in FIG. 1 so that the cycle is completed. After passing through half of the third rotation angle range, the actuation projection 30 is in the position shown in FIG. 4. In this position it is out of engagement with the actuation section 24 as long as the valve is in the open position, held in particular by the cooling liquid pressure. In this resting position of the actuation projection 30, the valve element may move freely between the open position and the closed position. Only the actuation section 24 bearing against a suitable stop surface prevents the valve plate 20 from being lifted off the valve seat 22 beyond the open position.

If the actuation projection 30 is held by corresponding activation of the electric motor 38 in the position shown in FIG. 4, in which the actuation projection 30 is once again located on the longitudinal axis of the valve rod 16, as a result an electrically lockable non-return valve function is implemented. Thus, in this state cooling liquid may flow in the direction opposing the operation, i.e. in the example shown from the cooling-liquid port 14, past the valve plate 20 into the cooling-liquid port 12. This is possible until the opposing cooling liquid pressure, which is thus exerted, pushes the valve plate 20 again into the closed position, as is shown in FIG. 5. If normal operation is subsequently carried out again, the valve plate 20 is pushed once again into the open position and the cycle of the valve arrangement may be performed again in the manner described above.

LIST OF REFERENCE NUMERALS

10 Housing
12, 14 Cooling-liquid port
16 Valve rod
18 Guide
20 Valve plate
22 Valve seat
24 Actuation section
26 Rotary disk
28 Rotation axis
30 Actuation element
32 Outer toothing
34 Drive worm
36 Drive shaft
38 Electric motor
40 Longitudinal axis

The invention claimed is:

1. A valve arrangement for a cooling system of a vehicle, comprising: a housing having at least two cooling-liquid ports, further comprising a valve element, which can be adjusted between an open position in which it opens up a connection between the cooling-liquid ports and a closed position in which it separates the connection between the cooling-liquid ports, and comprising a drive for adjusting the valve element between the open position and the closed position, wherein the drive comprises an electric motor, which electric motor drives an actuation element which actuates the valve element, wherein the actuation element moves along a circular path section in the course of an adjustment of the valve element between the open position and the closed position.

2. A valve arrangement according to claim 1, wherein the valve element is adjusted by the actuation element from the open position into the closed position against the pressure of cooling liquid flowing through the cooling-liquid ports during operation of the valve arrangement.

3. A valve arrangement according to claim 1, wherein the valve element is a plate valve element having a valve plate held on one end of a valve rod, which valve plate, in the closed position, bears against an assigned valve seat and, in the open position, is lifted off the valve seat.

4. A valve arrangement according to claim 3, wherein, at a constant rotational speed of the actuation element, a stroke speed of the plate valve element effected by the actuation element decreases starting from the open position until the closed position is reached.

5. A valve arrangement according to claim 4, wherein the stroke speed of the plate valve element effected by the actuation element is zero when the closed position is reached.

6. A valve arrangement according to claim 5, wherein, in the closed position of the plate valve element, the actuation element is positioned on an imaginary extension of a longitudinal axis of the valve rod, and the imaginary extension is in line with and extends through a central axis of the circular path section.

7. A valve arrangement according to claim 6, wherein a stop is provided which prevents the valve plate being lifted off the valve seat beyond the open position.

8. A valve arrangement according to claim 7, wherein an actuation section of the plate valve element is provided at that end of the valve rod which is remote from the valve plate, and wherein the actuation element, at least during its movement along the circular path section between the open position and the closed position of the plate valve element, bears against the actuation section.

9. A valve arrangement according to claim 8, wherein the actuation element can be moved completely around a circular path, which includes the circular path section, by the electric motor,
- wherein, starting from the open position as a starting position of the plate valve element, the plate valve element is able to be moved into the closed position by a movement of the actuation element along the circular path in a first direction of rotation and through a first rotation angle range,
- wherein the plate valve element is able to be moved from the closed position back into the open position by a further movement of the actuation element along the circular path in the first direction of rotation and through a second rotation angle range, wherein full movement of the actuation element along the circular path section is achieved by rotation of the actuation element along the circular path through both the first rotation angle range and the second rotation angle range,
- wherein the plate valve element remains in the open position during a further movement of the actuation element along the circular path in the first direction of rotation and through a third rotation angle range that completes the circular path, wherein the plate valve element can, at least through part of the third rotation angle range, be moved freely between the open position and the closed position.

10. A valve arrangement according to claim 9, characterized in that a control device is provided which is designed to activate the electric motor for the adjustment of the valve element between the open position and the closed position by a movement of the actuation element in the first direction of rotation.

11. A valve arrangement according to claim 10, characterized in that the control device is designed to activate the electric motor for the stopping of the actuation element in the third rotation angle range.

12. A valve arrangement according to claim 1, wherein a rotary disk driven in rotation by the electric motor is provided, and in that the actuation element is an actuation projection arranged on the rotary disk eccentrically with respect to an axis of rotation of the rotary disk, said actuation projection bearing against the valve element for the actuation of the valve element, and the drive is configured to only rotate said rotary disk and said actuation projection in a first rotation direction.

13. A valve arrangement according to claim 12, wherein the electric motor drives the actuation element via a reduction gear mechanism.

14. A valve arrangement according to 13, wherein the electric motor drives a drive worm in rotation, and in that the rotary disk has an outer toothing which engages with the drive worm.

15. A valve arrangement for a cooling system of a vehicle, comprising:
- a housing having first and second cooling-liquid ports;
- a valve comprising a valve element and a valve rod, the valve movable between an open position in which a connection between the first and second cooling-liquid ports is open and a closed position in which the connection between the first and second cooling-liquid ports is closed by the valve element; and
- a drive for adjusting the valve between the open position and the closed position, wherein the drive comprises an electric motor that drives an actuation element, wherein the actuation element engages part of the valve to push the valve from the open position to the closed position during rotation of the actuation element in a first direction through a first rotation angle range along a circular path section.

16. The valve arrangement of claim 15, wherein, upon further rotation of the actuation element by the drive in the first direction through a second rotation angle range, the actuation element permits movement of the valve from the closed position back to the closed position under pressure of cooling liquid flowing from the first cooling-liquid port to the second cooling-liquid port.

17. The valve arrangement of claim 16, wherein, upon further rotation of the actuation element by the drive in the first direction through a third rotation angle range, a movement of the actuation element through a complete circular path is achieved.

18. The valve arrangement of claim 15, wherein, when the valve is in the closed position, the actuation element is positioned in line with a longitudinal axis of the valve rod, and the longitudinal axis extends through a central axis of the circular path section.

* * * * *